United States Patent
Valentine et al.

(10) Patent No.: US 7,523,722 B2
(45) Date of Patent: Apr. 28, 2009

(54) FUEL ADDITIVE CONCENTRATE DOSING SYSTEM

(75) Inventors: James M. Valentine, Fairfield, CT (US); Curtis N. Knapper, New Fairfield, CT (US)

(73) Assignee: Clean Diesel Technologies, Inc., Bridgeport, CT (US)

( * ) Notice: Subject to any disclaimer, the term of this patent is extended or adjusted under 35 U.S.C. 154(b) by 0 days.

(21) Appl. No.: 11/571,584

(22) PCT Filed: Jul. 1, 2005

(86) PCT No.: PCT/US2005/023354

§ 371 (c)(1),
(2), (4) Date: Nov. 30, 2007

(87) PCT Pub. No.: WO2006/007535

PCT Pub. Date: Jan. 19, 2006

(65) Prior Publication Data

US 2008/0210184 A1    Sep. 4, 2008

Related U.S. Application Data

(60) Provisional application No. 60/584,659, filed on Jul. 1, 2004, provisional application No. 60/584,634, filed on Jul. 1, 2004.

(51) Int. Cl.
*F02B 43/04* (2006.01)
(52) U.S. Cl. ...................................... 123/1 A
(58) Field of Classification Search .................. 123/1 A, 123/198 A, 198 D, 198 B, 466, 494, 515; 220/DIG. 32; 222/562
See application file for complete search history.

(56) References Cited

U.S. PATENT DOCUMENTS

| | | | | |
|---|---|---|---|---|
| 4,402,351 | A * | 9/1983 | Momura et al. | 141/98 |
| 4,596,277 | A * | 6/1986 | Djordjevic | 141/98 |
| 5,992,473 | A * | 11/1999 | Hammonds | 141/9 |
| 6,321,692 | B1 * | 11/2001 | Rayner | 123/1 A |
| 6,860,241 | B2 | 3/2005 | Martin et al. | |
| 6,942,124 | B2 | 9/2005 | Dehn et al. | |
| 7,216,681 | B2 * | 5/2007 | Valentine et al. | 141/349 |
| 2006/0254535 | A1* | 11/2006 | Valentine et al. | 123/1 A |

FOREIGN PATENT DOCUMENTS

EP    0661429    * 11/1994

* cited by examiner

*Primary Examiner*—Hai H Huynh
(74) *Attorney, Agent, or Firm*—Thaddius J. Carvis

(57) ABSTRACT

A safe, reliable system for automatically dosing diesel truck fuel tanks with a fuel additive is provided. The additive, such as a concentrated solution containing fuel borne catalyst (FBC), is fed by gravity and dosing is controlled with a signal from a switch located on the ignition switch and/or the fuel tank cap and filler spout. When the ignition switch is in the on position and/or the cap is removed, a solenoid opens a valve and permits a timed or otherwise measured amount of additive to flow into the tank while the cap is off. Replacing the cap and/or turning off the ignition switch preferably stops the flow of additive, the flow rate being set to supply a predetermined amount of additive during an average refueling interval.

7 Claims, 2 Drawing Sheets

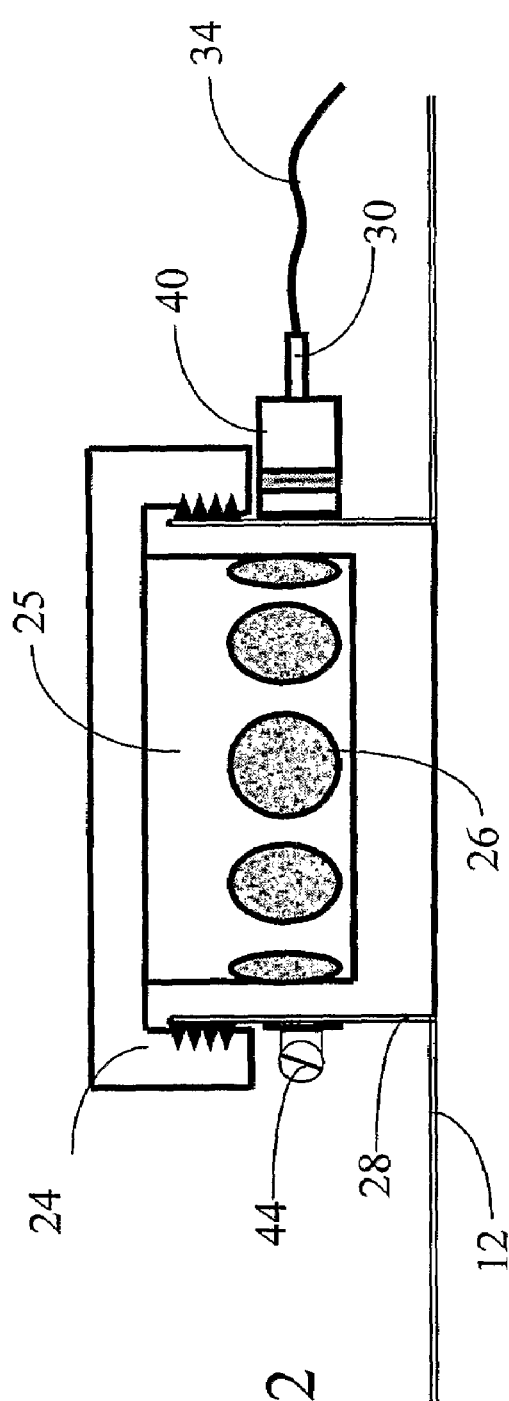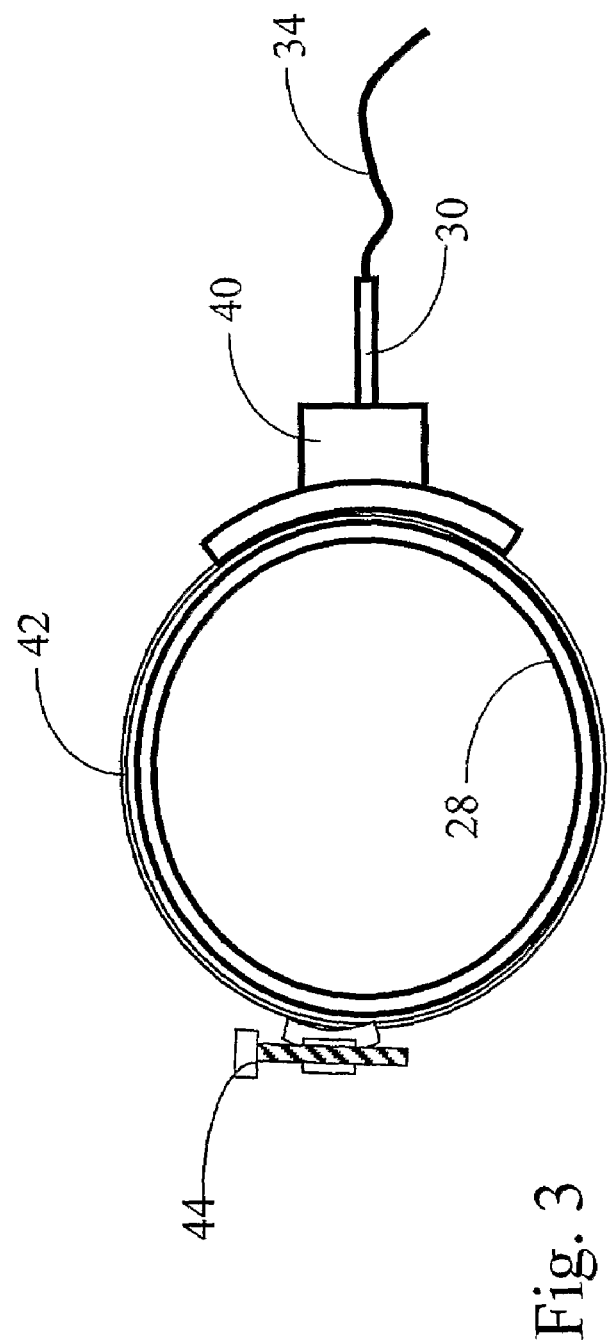

FUEL ADDITIVE CONCENTRATE DOSING SYSTEM

TECHNICAL FIELD

The invention relates to a safe, reliable system for automatically dosing truck fuel tanks with a fuel additive, particularly a concentrate containing a fuel borne catalyst (FBC), using gravity as the means of injection on the basis of a signal from a switch. In one case the signal is from a switch located on the fuel lank cap and filler spout, and in another case it is from the ignition switch.

The invention relates to means and methods that enable a safe and reliable introduction of a fuel additive into the fuel tank when fueling on a vehicle, particularly one powered by a medium duty diesel engine. Fuel additives, especially FBC's in the form of concentrates containing platinum group metals, cerium, iron, copper, manganese; magnesium and the like or combinations, can enable cleaner burning of a fuel in an engine, thereby allowing for more efficient operation of the engine. The additives can also reduce pollutants as a primary measure or in combination with an after treatment device.

BACKGROUND ART

Many prior art systems proposed for dosing additives involve complex monitoring electronically and/or mechanically to achieve the desired concentration of active catalytic metals in the fuel. The provision of systems that require modifications to fuel tanks or to wiring harnesses are not practical for retrofit applications due to the great variety of trucks being used commercially, even by a single fleet owner.

Other prior art systems require operator monitoring and/or intervention. However, fleet operators need the assurance that an FBC additive concentrate is being properly added to the fuel of designated vehicles without requiring a particular operator to perform any task other than his normal fueling operation. Operator monitoring or intervention can be problematic, especially where the same vehicle is used by different operators.

Current and proposed regulations challenge manufacturers to both achieve good fuel economy and reduce emissions. While fuel additives will likely be necessary to achieve the objectives of the regulations, the art has provided no simple device capable of metering an effective additive into the fuel in a reliable manner with no operator intervention or attention.

Automatic correctly proportioned introduction of fuel additives into the fuel tanks of vehicles on a regular, consistent basis is a challenge to fuel additive suppliers and fleet owners desiring to use them. There is a current need for a safe, economical and effective answer to the problems associated with the regular dispensing additives into the fuel.

BRIEF SUMMARY OF THE INVENTION

It is an objective of the invention to provide a safe, reliable additive dosing system for automatically introducing fuel additive into a fuel lank for the purpose of enhancing the operation of an internal combustion engine and/or reducing emission of pollutants.

It is another objective of the invention to maintain a supply of fuel additive on the vehicle with the capacity to operate the vehicle for extended driving times, e.g., at least about 750 miles or a full days driving, prior to requiring a refill.

It is another objective of the invention to eliminate the requirement of the vehicle operator to have to monitor or activate any device on the vehicle so as to accomplish dosing of the fuel tank.

It is another objective of the invention to provide an override control that stops additive introduction should the operator fail to properly close the fuel tank after the vehicle is being refueled.

It is another objective of the invention to dose the fuel tank at a predetermined rate which corresponds to a predetermined average fueling rate from the fuel pump.

It is another objective of invention to activate the system automatically when the fuel cap is removed from the fuel tank and deactivated when the fuel cap is placed back on the tank.

It is another objective of invention to activate the system automatically when the engine is started and to stop it when the engine is turned off.

It is another objective of invention to energize a small calibrated solenoid valve using the vehicles electricity for power.

It is another objective of invention to limit the maximum amount of time the solenoid valve coil be open by utilizing a timer relay to de-energize the solenoid valve alter a preset amount of time.

These and other objects are achieved by the invention, which provides two embodiments of fuel additive dosing systems, both simple in design and commonly employing gravity to feed the additive.

In a first embodiment the invention provides a system that has process and apparatus aspects described below to automatically feed fuel additive to fuel by gravity and based on a fuel cap removal signal. In one preferred aspect, the invention comprises a safe, reliable system for automatically dosing fuel tanks with a fuel additive, particularly a concentrate containing a fuel borne catalyst (FBC) using gravity as the means of injection on the basis of a signal from a switch located on the fuel tank filler spout and is actuated by removal of the filler cap.

In a second embodiment a safe, the invention provides a system that has process and apparatus aspects described below to automatically feed fuel additive to fuel by gravity and based on a signal from the ignition key or other indicator that the engine has been started. In one preferred aspect, the invention comprises a safe, reliable system for automatically dosing fuel tanks with a fuel additive, particularly a concentrate containing a fuel borne catalyst (FBC) using gravity as the means of injection on the basis of a signal from an ignition key switch and a controller to periodically provide predetermined doses of additive to maintain an effective additive concentration in the fuel.

Preferred aspects are described below.

BRIEF DESCRIPTION OF THE DRAWINGS

FIG. 2 is a schematic side elevation in cross section of a fuel tank cap on a fuel tank filler spout, the cap comprising magnets which work with a reed switch positioned on the filler spout for sending a signal to a controller.

FIG. 3 is a schematic top plan view of the attachment of a reed switch assembly to a fuel tank filler spout.

DETAILED DESCRIPTION OF THE INVENTION

Figure 1:
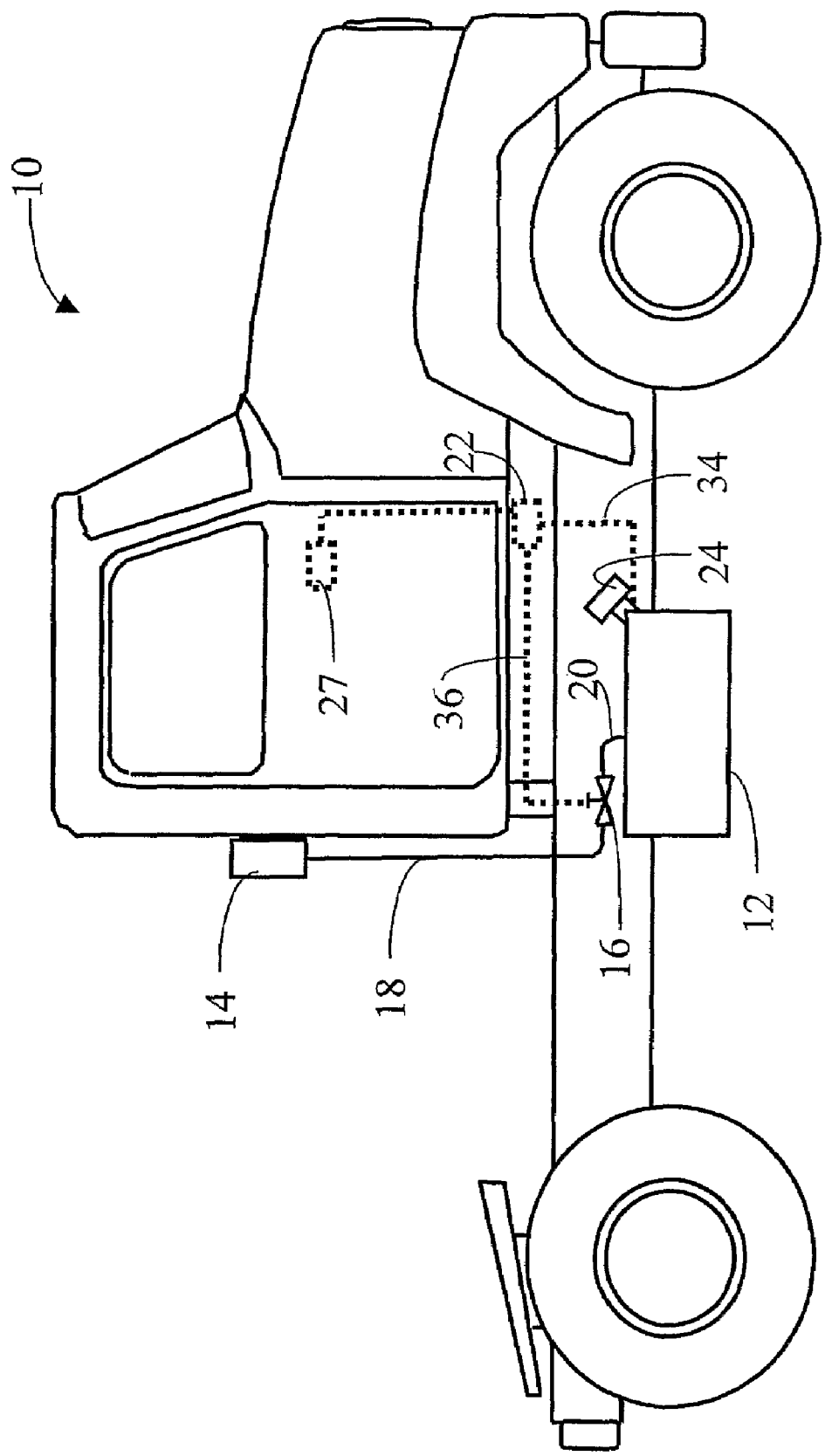
FIG. 1 is a schematic diagram of a truck having a switch activated gravity feed additive concentrate dosing system.

The invention provides a safe, reliable system for automatically dosing diesel truck fuel tanks with a fuel additive, particularly a concentrate containing fuel borne catalyst (FBC) using gravity as the driving force for injection into the fuel. The timing and rate of injection is controlled responsive to a control signal from a switch located on the ignition switch and/or the fuel tank cap and filler spout. The system will operate effectively to supply FBC additives to other vehicles as well, but this description is described in connection with diesel trucks as the preferred use of the invention.

In operation of the invention in one preferred form as shown in FIG. 1, an FBC additive concentrate is automatically fed to a truck 10 fuel tank 12 to power a diesel engine (not shown) with increased fuel economy and/or lower emissions. The FBC is held in a supply vessel 14 as a concentrate in a suitable chemical form and with suitable solvents and other additives, such as described in U.S. Pat. No. 6,003,303 and the references cited therein. The supply vessel 14 is positioned at a predetermined height above a controller actuatable dispensing valve 16 (typically, solenoid operated) and is connected to it by a supply line 18 which permits FBC concentrate to flow from the vessel 14 to the valve 16.

When the valve 16 is actuated to be open, the FBC concentrate flows through the valve 16 to fuel tank 12 by gravity through supply lines 18 and 20. When the valve 16 is actuated to be in the closed position, no FBC concentrate flows to the tank. Preferably, the valve 16 is spring or otherwise biased to be in a normally closed position. That way, there must be a positive signal to open the valve and permit the additive to flow through lines 18 and 20 to tank 12. The valve 16 preferably has an orifice (not shown) which is calibrated to provide the desired flow rates.

The valve 16 is preferably a solenoid valve and is actuated by a control signal from controller 22 in response to a sensor indicating that the ignition switch is in the on position or the cap 24 has been removed from the tank 12. FIG. 2 shows cap 24 as including a series of permanent magnets 26, which with the cap in position on filler spout 28 will hold reed switch 30 in the open position, providing no signal to controller 22. But, when the cap 24 is removed, the reed switch goes to a preferred normally closed position, closing a circuit permitting a signal to be sent to controller 22, via control line 34 or the like.

FIG. 2 shows cap 24 being threadedly engaged with fuel tank filler spout 28. The cap 24 is provided with a downwardly depending sleeve 25 including a plurality of magnets 26 aligned uniformly around the sleeve 25. The magnets are preferably of the Nd—Fe—B type and are conveniently in the form of nickel plated discs having dimensions of 0.5 inch diameter and a thickness of 0.2 inches. The sleeve 25 is preferably of a non ferromagnetic material such as aluminum and can be affixed to the cap 24 by suitable means such as with epoxy adhesive.

The reed switch 30 is shown in FIG. 3 as being held in a non ferromagnetic fitting (e.g., aluminum) 40 which is secured to fuel filler spout 28 such as by a strap 42 and a screw tightening device 44 or other suitable means. In general, reed switches comprise two identical flattened ferromagnetic reeds within a sealed glass housing, which effectively seals the reeds from the environment. When a magnetic field is brought near the switch, the reeds become flux carriers in the magnetic circuit. The overlapping ends of the reeds become opposite magnetic poles, which attract each other. To adapt such a switch to the device of the invention it is preferred to employ a reed switch of Type C, wherein a small magnet biases normally-open contacts to the closed position in the absence of a stronger magnet of opposite polarity. The invention provides magnets 26 in the filler cap to provide a strong opposite polarity magnetic field to overcome the bias of the smaller magnet when the cap is in place on the filer spout 28. When the cap is removed, the smaller biasing magnet is sufficient to close the switch, the circuit is completed and a signal is sent to the controller that the cap is off.

The controller 22 can comprise a simple timer circuit with preset limits or it can include a programmable logic circuit, which provides considerable flexibility without significantly increasing the cost. When the signal is received by the controller 22 that the ignition switch is in the on position and/or the cap has been removed, the controller will send a control signal via line 36 or the like to a solenoid or other actuator for valve 16, which causes the valve to open and for FBC additive concentrate to flow from vessel to tank 12. Optionally, the controller can be connected to the electrical power switch 27 for the vehicle to respond to a simple on/off or other signal.

The controller 22 comprises a timing device or circuit which can be set to limit the maximum and, if desired, minimum open times for the valve 16. In one particular case, the controller with its timer permits concentrate to flow into the tank 12 only while the ignition switch is in the on position and/or the cap is off and then only for a maximum of 10 minutes. In this case it has been found that sufficient FBC additive concentrate can automatically flow by gravity into a 66 gallon tank to provide a fuel to concentrate weight ratio of about 1500:1 using a preferred platinum and cerium additive combination as described in U.S. Pat. No. 6,003,303, to provide a platinum concentration of about 0.15 ppm and a cerium concentration of about 8 ppm.

These doses are highly effective in providing significant improvements in fuel economy for delivery trucks and to permit diesel particulate traps (DPT's) and other after treatment devices used with them to continuously operate for long periods of time to reduce particulate emissions from such trucks. The size of the vessel 14 is desirably large enough to hold additive sufficient for a plurality of fueling stops and to run for at least a full day of operation. With a target of at least a full days driving or at least about 750 miles traveled for a medium duty delivery truck, about two liter capacity will permit the vehicle operator to be free of any concern with the dispenser and for maintenance personnel to refill the vessel 14 on a daily basis. Other design criteria will work as well. It is an advantage of the invention that the device can dose the fuel tank at a predetermined rate, e.g., a rate of 65 ml/minute which corresponds to a fueling rate from the fuel pump of 20 to 40 gallons per minute.

In the cap-off dosing system, when the cap 24 is removed, a solenoid opens valve 26 and permits a timed or otherwise measured amount of additive to flow into the tank 12 while the ignition switch is in the on position and/or the cap is off. Replacing the cap preferably stops the flow of additive, the flow rate being set to supply a predetermined amount of additive during an average refueling interval.

In the engine on dosing system, the controller 22 can comprise a simple timer circuit with preset limits or it can include a programmable logic circuit, which provides considerable flexibility without significantly increasing the cost. When the signal is received by the controller 22 that the engine is on, the controller will periodically send a control signal via line 36 or the like to a solenoid or other actuator for valve 16, which causes the valve to open and for FBC additive concentrate to flow from vessel to tank 12.

The above description is for the purpose of teaching the person of ordinary skill in the art how to practice the present invention, and it is not intended to detail all of those obvious modifications and variations of it which will become apparent to the skilled worker upon reading this description. It is intended, however, that all such obvious modifications and variations be included within the scope of the present inven-

The invention claimed is:

1. A safe, reliable system for automatically dosing fuel tanks with a fuel additive, particularly a concentrate containing a fuel borne catalyst (FBC) for increasing fuel economy and/or lower emissions using gravity as the means of injection on the basis of a signal from a switch located on the fuel tank filler spout and is actuated by removal of the filler cap, comprising:
   a supply vessel for fuel borne catalyst concentrate positioned at a predetermined height above a fuel tank for holding fuel to power a diesel engine;
   a fuel tank filler spout leading to the fuel tank and including a reed switch;
   a removable cap for the fuel tank filler spout including magnets capable of operating the reed switch on said filler spout;
   a supply line which permits fuel borne catalyst concentrate to flow from the supply vessel to the fuel tank;
   an actuator operated dispensing valve positioned in the supply line;
   wherein when the cap is removed from the fuel tank filler spout, the reed switch causes the dispensing valve to open and for fuel borne catalyst concentrate to flow by gravity from the supply vessel through the valve and to the fuel tank.

2. A system according to claim 1 wherein dosing is stopped after a predetermined period of time after cap removal.

3. A safe, reliable system for automatically dosing fuel tanks with a fuel additive, particularly a concentrate containing a fuel borne catalyst (FBC) using gravity as the means of injection on the basis of a signal from an ignition key switch and a controller to periodically supply a predetermined amount of additive to the fuel tank for increasing fuel economy and/or lower emissions, comprising:
   a supply vessel for fuel borne catalyst concentrate positioned at a predetermined height above a fuel tank for holding fuel to power a diesel engine;
   a supply line which permits fuel borne catalyst concentrate to flow from the supply vessel to the fuel tank;
   an actuator operated dispensing valve positioned in the supply line;
   a controller responsive to an ignition switch position;
   wherein the controller causes the dispensing valve to open and for fuel borne catalyst concentrate to flow by gravity from the supply vessel through the valve and to the fuel tank when the ignition switch is in the on position.

4. A system according to claim 3 wherein the rate of additive supply is based on average fuel consumption.

5. A system according to claim 3 wherein dosing is stopped when the key is in the off position.

6. A system according to claim 3 wherein the controller signal operates a solenoid valve which opens to permit flow of additive.

7. A system according to either claim 1 or claim 3 wherein a fuel additive reservoir is provided to maintain sufficient concentrate to permit driving for a day.

* * * * *